(12) United States Patent
Krannich et al.

(10) Patent No.: US 8,275,391 B2
(45) Date of Patent: Sep. 25, 2012

(54) ENHANCING CELL RESOLUTION MOBILE POSITIONING ESTIMATES VIA SIGNAL STRENGTH MEASUREMENT REPORTED BY MOBILE STATION

(75) Inventors: Ralf Krannich, Heiligenhaus (DE); Martin Kuipers, Dallgow-Döberitz (DE); Kurt Majewski, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 678 days.

(21) Appl. No.: 10/573,751

(22) PCT Filed: Jul. 19, 2004

(86) PCT No.: PCT/EP2004/051544
§ 371 (c)(1),
(2), (4) Date: Mar. 29, 2006

(87) PCT Pub. No.: WO2005/034556
PCT Pub. Date: Apr. 14, 2005

(65) Prior Publication Data
US 2006/0293062 A1 Dec. 28, 2006

(30) Foreign Application Priority Data
Sep. 29, 2003 (DE) .................. 103 45 224

(51) Int. Cl.
*H04W 24/00* (2009.01)
(52) U.S. Cl. .............. 455/456.1; 455/404.2; 455/456.3; 455/456.4; 455/456.5
(58) Field of Classification Search ............... 455/404.2, 455/456.1, 456.2, 456.3, 456.5, 456.6
See application file for complete search history.

(56) References Cited

U.S. PATENT DOCUMENTS

| | | | |
|---|---|---|---|
| 5,379,447 A * | 1/1995 | Bonta et al. | 455/437 |
| 6,181,944 B1 * | 1/2001 | Uebayashi et al. | 455/456.2 |
| 6,799,046 B1 * | 9/2004 | Tang | 455/456.1 |
| 2003/0069024 A1 * | 4/2003 | Kennedy, Jr. | 455/456 |

(Continued)

FOREIGN PATENT DOCUMENTS

| | | |
|---|---|---|
| DE | 100 56 222 | 5/2002 |
| WO | 98/15149 | 4/1998 |
| WO | WO 9815149 A1 * | 4/1998 |
| WO | 01/28272 | 4/2001 |
| WO | 02/082832 | 10/2002 |

OTHER PUBLICATIONS

"Digital cellular telecommunications system (Phase 2+); Location Services (LCS); Functional description; Stage 2 (3GPP TS 03.71b version 7.9.0 Release 1998); ETSI 101 724" ETSI Standards, European Telecommunications Standards Institute, Sophia-Antipo, FR, vol. 3-SA2; No. V790, Mar. 2002, XP014006568, ISSN: 0000-0001.

*Primary Examiner* — Jean Gelin
*Assistant Examiner* — Amanuel Lebassi
(74) *Attorney, Agent, or Firm* — Staas & Halsey LLP

(57) ABSTRACT

In a method for estimating the position of a subscriber station of a radio communication system, a receiver station receives reports from the subscriber station, said reports containing information relating to the signal strength of a receiving signal of at least one transmitting station in the locality of the subscriber station. The reports are stored in a memory of a network device of the radio communication system and a position determining unit takes into account at least two reports stored prior to the request for position estimation, in order to estimate the position of the subscriber station.

14 Claims, 2 Drawing Sheets

U.S. PATENT DOCUMENTS

| | | | |
|---|---|---|---|
| 2004/0022214 A1* | 2/2004 | Goren et al. | 370/332 |
| 2004/0152471 A1* | 8/2004 | MacDonald et al. | 455/456.1 |
| 2004/0180671 A1* | 9/2004 | Spain, Jr. | 455/456.1 |
| 2006/0141998 A1* | 6/2006 | Kennedy et al. | 455/423 |

* cited by examiner

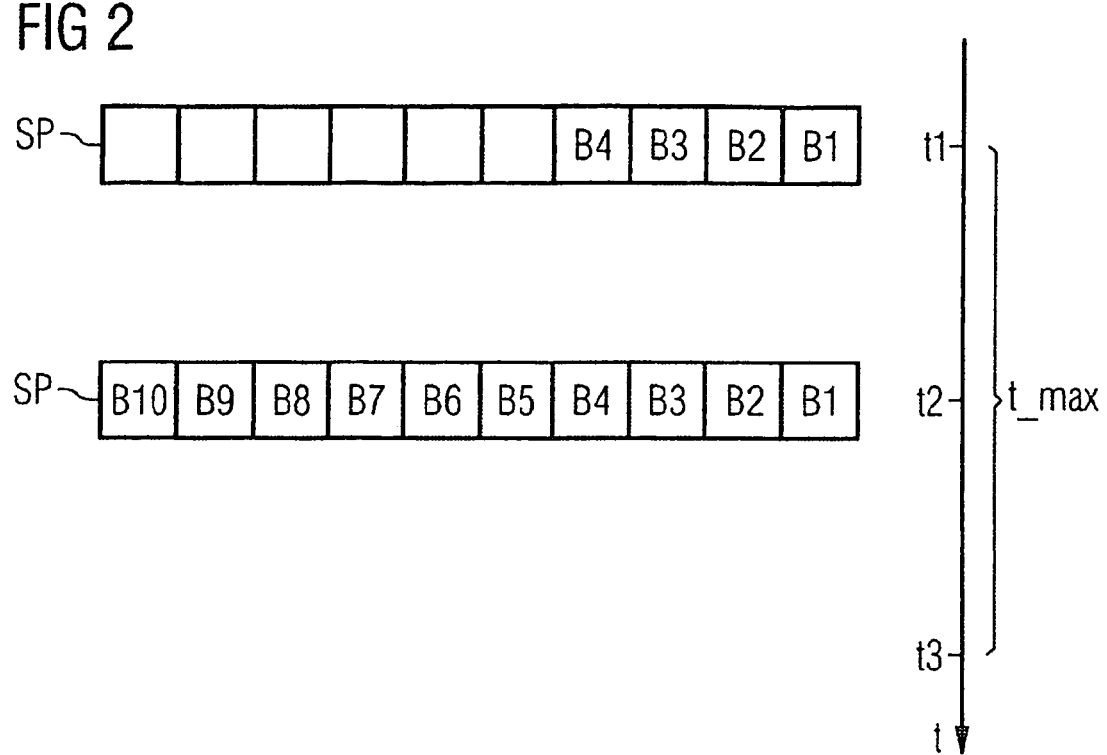
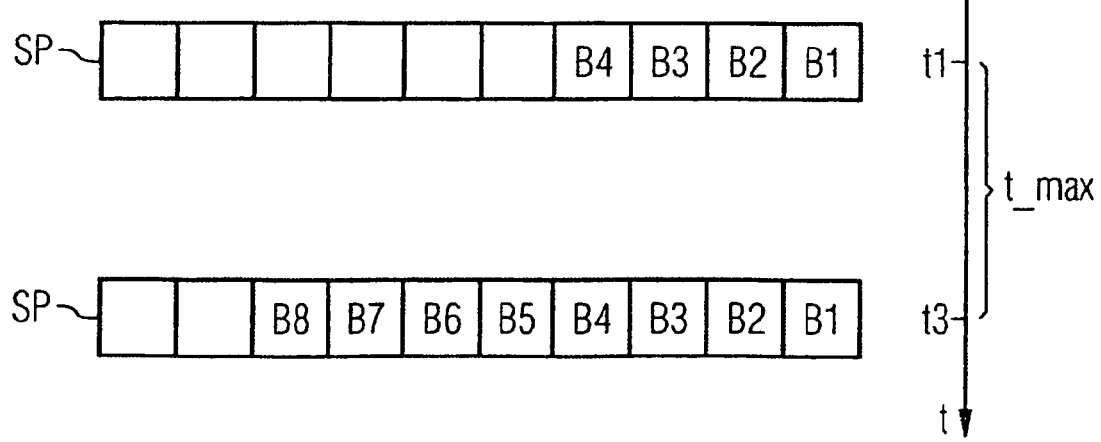

ENHANCING CELL RESOLUTION MOBILE POSITIONING ESTIMATES VIA SIGNAL STRENGTH MEASUREMENT REPORTED BY MOBILE STATION

CROSS REFERENCE TO RELATED APPLICATIONS

This application is based on and hereby claims priority to PCT Application No. PCT/EP2004/051544 filed on Jul. 19, 2004 and German Application No. 10345224.9 filed Sep. 29, 2003, the contents of which are hereby incorporated by reference.

BACKGROUND OF THE INVENTION

The invention relates to a method for estimating the position of a subscriber station of a radio communication system and a corresponding network device.

Localizing subscriber stations in cellular networks has become increasingly important in the past few years. On the one hand, there are regulations in some countries, whereby the operating companies are bound by law to determine the location of emergency calls. On the other hand, there is a commercializing of location-associated services at present, which requires a simple and cost-effective localizing of subscriber stations. There is a plurality of technical solutions in order to estimate the position of a subscriber station, the accuracy of which and the cost of which vary. For example, the position of a subscriber station can be determined with the help of an EOTD (Enhanced Observed Time Difference) method, by the UTDOA (Uplink Time Difference of Arrival) or the AGPS (Assisted GPS). Either the installation of additional components in the radio access network or the use of special subscriber stations is required for this purpose.

On the one hand, many operating companies are not willing to make such investments while, on the other hand, many applications do not require a very accurate determination of the position. That is why localizing methods are particularly in demand, said methods being cost-effective and able to locate a subscriber station with an acceptable level of accuracy. However, the use of cell identification (cell ID) is not sufficient for this purpose. Only the inclusion of information in addition to the cell identification permits the positioning of subscriber stations with an accuracy which is sufficient for most applications. One option for making available additional information is represented by the evaluation of the signal strengths of signals received from a subscriber station. As a rule, the signal strengths of receive signals are used by the transmitting station, which provides coverage for a radio cell in which the subscriber station is located and by additional radio cells adjacent to the transmitting stations. For example, in GSM systems (GSM: Global System for Mobile Communications) each active mobile station reports every 480 ms about the signal strength of receive signals of the base station covering them and about the signal strengths of additional receive signals of up to six adjacent base stations. These reports are compared with a signal strength database in order in this way to estimate the most likely location of the subscriber station in combination with the cell identification, if required.

Such methods and systems are for example known from the international patent application WO 98/15149.

Previously known methods for estimating the position of subscriber stations produce good results for estimating the position especially if a plurality of reports of a subscriber station about signal strengths of receive signals is used at the same time for estimating the position. However, in a GSM system for example, when for example 10 reports about the signal strengths of receive signals are used, there is an additional delay of approximately five seconds when determining the positions of a subscriber station.

From DE 100 56 22 A1, a method is known for localizing the traffic in a cellular mobile telephony network, in which from the transition probabilities of a hidden Markov model and the observation probabilities of an interference model from a sequence of reports, a highly probable path of a mobile subscriber can be determined. The reports contain the field strength values of base stations measured by the mobile subscriber. The reports are either sent directly to an arithmetic unit by the mobile subscriber or first collected by a base station and, if required, supplemented by additional measured values and sent in the form of one complete message to the arithmetic unit.

SUMMARY OF THE INVENTION

One possible object of the invention relates to improving the estimation of the position with regard to the processing speed.

The inventors propose a method for estimating the position of a subscriber station of a radio communication system, a receiver station receives reports from the subscriber station, said reports containing information relating to the signal strength of a receive signal of at least one transmitting station in the locality of the subscriber station. The reports are stored in a memory of a network device of the radio communication system and a position determining unit takes into account at least two reports stored prior to the request for position estimation in order to estimate the position of the subscriber station.

The method makes it possible that, on submission of a request for estimating the position of a subscriber station, reports with information about the signal strengths of receive signals can immediately be read from the memory and delivered to the position determining unit. Therefore, position estimation can be carried out without an additional time delay. Information about the signal strength of a receive signal is for example the signal strength of the receive signal or a parameter from which the signal strength can be derived.

In a preferred embodiment, the receiver station is used as the network device. The continuously stored reports about the subscriber station from the receiver station, for example the base station, which provides coverage for the radio cell in which the subscriber station is located, are for example used to make a decision about the handover to adjacent base stations. The reports are only signaled to the position determining unit if there is a request to determine the position of the subscriber station, i.e. the signaling load occurring in the radio communication system as a result of the reports is minimal.

Advantageously, during an active connection, the reports are received and/or stored regularly at specific time intervals in an idle mode of the subscriber station. A number of reports required for estimating the position can be requested at any time from the memory as a result of them being received at regular intervals.

It is advantageous if a maximum of a first number of reports is stored in the memory. The memory space used for reports can be selected in such a way that it can store only the first number of reports, for example, those reports that are used as a maximum number by the position determining unit in order to estimate the position can be stored. If the memory is full, the oldest report will be replaced with the next report received from the subscriber station. In this way, in the case of a full memory, the most up-to-date reports are always available in the memory.

In a further development, the position determining unit requests a second number of reports from the network device. This has the advantage that the position determining unit can determine the second number of reports depending on the accuracy required for estimating the position.

A preferred further development provides that the network device, if at the time of the request it has stored a smaller number of reports than the second number of reports, stores additional reports until the second number of reports has been stored or until a maximum period of time has expired and either prior to the expiry of the maximum period of time of the second number of reports or after the expiry of the maximum period of time sends the number of reports stored upon that time to the position determining unit, even if the set of stored reports remains smaller than the second number of reports.

The further development makes it possible that, reports are sent to the position determining unit at the latest after the maximum period of time has expired. Therefore, the time required for estimating the position is likewise limited to a maximum value.

Advantageously, the position determining unit carries out the estimation of the position by comparing the signal strengths given in the reports with a signal strength database in accordance with WO 98/15149.

It is advantageous if, in addition, the transmitting power is given in the reports, by which at least one transmitting station has sent the receive signal in each case. Signals on signaling channels, for example, broadcasting channels, are usually sent at any time with a transmitting power that is well-known in the radio communication system and constant, and received by subscriber stations. From the transmitting power on the signaling channels known in particular by the position determining unit and the signal strength of the receive signal which can be taken from the reports, it is in this way also possible to calculate and take into account the signal attenuation for estimating the position. As a result of the fact that in the reports, the transmitting power by which the receive signal was sent is in addition given, it is in this way also possible to take into account the signal strength of the receive signal for estimating the position if the receive signal was received on a traffic channel with a transmitting power control, i.e. on a channel with a continuously varying transmitting power.

Advantageously, as additional information about estimating the position, the reports can in each case be supplemented by the transmitting power of the subscriber station and the corresponding receive power at the receiver station receiving the reports.

The network device proposed by the inventors has all the required features for carrying out the method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic diagram of an exemplary embodiment for estimating the position of a subscriber station of a radio communication system and FIG. 2 shows a schematic diagram of a first sequence of occupancy of a memory with reports during the implementation of the method in accordance with FIG. 1, FIG. 3 shows a schematic diagram of a second sequence of occupancy of a memory with reports during the implementation of the method in accordance with FIG. 1.

DETAILED DESCRIPTION OF THE PREFERRED EMBODIMENT

Figure 1:
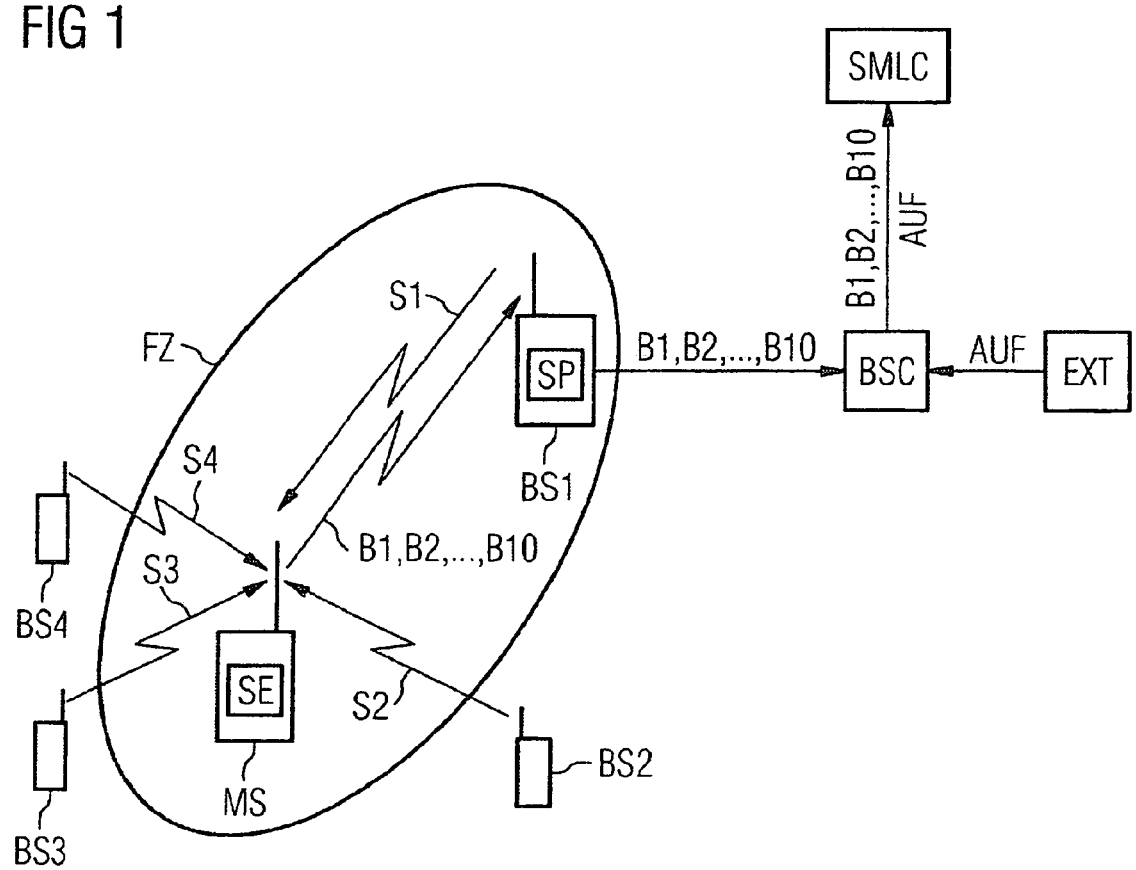

Reference will now be made in detail to the preferred embodiments of the present invention, examples of which are illustrated in the accompanying drawings, wherein like reference numerals refer to like elements throughout.

A subscriber station is for example a mobile telephone, even a portable, or a fixed device for the transmission of video and/or audio data, for sending faxes, sending Short Message Service messages SMSs and for sending e-mails and also for access to the Internet.

A receiver station is for example a subscriber station or a base station. Below, a base station is regarded as the receiver station, however without being limited thereto.

A transmitting station is for example a subscriber station or a base station. Below, a base station is regarded as the transmitting station, however without being limited thereto.

The method can advantageously be used in any radio communication systems. Radio communication systems mean any systems in which data can be transmitted between stations via a radio interface. The transmission of data can be both bidirectional and unidirectional. Radio communication systems are in particular any mobile radio systems for example in accordance with the GSM standard or the UMTS (Universal Mobile Telecommunication System) standard. Radio communication systems also mean future mobile radio systems for example of the fourth generation.

The method is described below using a mobile radio system in accordance with the GSM standard as a basis, however without being limited thereto.

FIG. 1 shows a schematic diagram of a radio communication system. A first base station BS1 supplies a radio cell FZ. The first base station BS1 is connected to a base station controller BSC. The base station controller BSC is connected to a core network via connections which are not shown. Via this hidden core network, external position determining services (LCS: Location Services) can send a request for estimating the position of a subscriber station via the base station controller BSC to a position determining unit SMLC, which as a result carries out the position estimation for the subscriber station.

In the radio cell FZ of the first base station BS1 there is a subscriber station MS with a transmitter and a receiver unit SE for transmitting and receive signals. Irrespective of whether or not a position estimation is carried out for the subscriber station MS or whether there is a request for estimating the position, the subscriber station MS continuously receives first receive signals S1 from the first base station BS1, second receive signals S2 from a second base station BS2, third receive signals S3 from a third base station BS3 and fourth receive signals S4 from a fourth base station BS4 and specifically for the four receive signals S1, S2, S3, S4 in each case a signal strength, i.e. a transmitting power of the receive signals S1, S2, S3, S4. The four receive signals S1, S2, S3, S4 are for example the signals of broadcasting channels on which the base stations BS1, BS2, BS3 and BS4 send for example information about their specific radio cell with a transmitting power, which is constant and known in the radio communication system. The receive signals S1, S2, S3, S4 can be received by the subscriber station MS both during an active connection with the first base station BS1 and in the idle mode. The subscriber station MS transmits information relating to the signal strengths of the receive signals S1, S2, S3, S4 at regular intervals for example every 480 ms as reports B1, B2, B3, B4, B5, B6, B7, B8, B9, B10 to the first base station BS1. The first base station BS1 stores the reports B1, B10 received by the subscriber stations MS in a memory SP.

Each report B1, B10 contains at least information relating to the signal strength of one of the four receive signals S1, S2, S3, S4. Preferably, each report contains information relating to the four receive signals S1, S2, S3, S4. The information, for example, explicitly gives the signal strength (receive power) of the specific receive signal or makes possible a calculation of the specific signal strength.

If the subscriber station MS, for example, receives the first receive signal S1 of the first base station BS1 on a traffic channel, which has a transmit power control, the subscriber station MS transmits in the reports B1, B10 in addition to the information relating to the signal strength of the first receive signal S1, also the associated transmitting power, by which the first base station BS1 has transmitted the first receive signal S1 in each case. The transmitting power of the first receive signal S1 is sent to the subscriber station MS for example from the first base station BS1 or can be calculated on the basis of the signal attenuation determined by it from signals received on the broadcasting channel of the first base station BS1. As an alternative, the first base station BS1 can even supplement the reports B1, B10 received from the subscriber station MS by its specific transmitting power. Information about the transmitting power of the receive signal of the first base station BS1 in the reports B1, B10 is effective when using a traffic channel in order to be taken into account in combination with the associated signal strength (receive power) of the receive signal for estimating the position of the subscriber station MS.

The base station controller BSC receives, for example, from an external unit EXT, for example an external position determining service, via the core network, which is not shown, a request AUF for estimating the position of the subscriber station MS. The request AUF is forwarded by the base station controller BSC to a position determining unit SMLC. As a result, the position determining unit SMLC initiates the position estimation of the subscriber station MS and requests from the first base station BS1, for example, ten reports about the signal strengths of receive signals. That is why the first base station BS1 subsequently transmits the ten reports B1, B10, which are available at the time of the request by the position determining unit SMLC in its memory SP, via the base station controller BSC to the position determining unit SMLC. By comparing the signal strengths of the receive signals which can be taken from the reports B1, B10 with a signal strength database, the position determining unit SMLC caries out a position estimation and transmits the estimated position to the external unit EXT.

For example, in the signal strength database, for a plurality of locations within the radio cell FZ of the first base station BS1, signal strengths or signal attenuations for signals from the first base station BS1 and from adjacent base stations, for example, from the second, third and the fourth base station BS2, BS3 and BS4 are stored. By comparing the signal strengths (or the calculated signal attenuations arising from these) measured by the subscriber station MS with the signal strength database, the location with the best correlation is established and determined as the estimated position.

In addition to the comparison of the signal strengths with the signal strength database, which can be taken from the reports B1, B10, the position determining unit SMLC can of course also include additional information about estimating the position. This additional information also includes for example the cell identification of the first base station BS1 allocated to the subscriber station MS, in the radio cell FZ of which the subscriber station has checked-in or also corrects the timing advance referred to in this way, i.e. the correction factor by which the subscriber station MS corrects its transmission points in time. The timing advance is sent to the subscriber station MS from the first base station BS1. The first base station BS1 determines the timing advance from the round-trip time of a signal from the first base station BS1 to the subscriber station MS and back. The current value of the timing advance can be added in each case by the first base station BS1 to the reports B1, B10 received from the respective subscriber station MS.

If, as shown in FIG. 1, the number of reports requested by the position determining unit SMLC at the point in time of the request AUF has already been stored in the memory SP of the first base station BS1, this said number of reports is immediately made available to the position determining unit SMLC and a position is therefore determined without additional delays.

FIG. 2 schematically shows an additional embodiment, which illustrates an alternative timing sequence of the occupancy of the memory SP for the radio communication system shown in FIG. 1.

At a first point in time t1, the position determining unit SMLC requests ten reports from the first base station BS1. However, at this first point in time t1 only four reports B1, B2, B3, B4 are stored in the memory SP. That is why the first base station BS1 waits to transmit reports to the position determining unit SMLC and, in addition, stores the reports from the subscriber station MS. At a second point in time t2, an additional six reports B5, B6, B7, B8, B9, B10 have arrived and been stored in the first base station BS1. As a result, the first base station BS1 transmits all ten the reports B1, B10 to the position determining unit SMLC.

The period of time between the request for the ten reports by the position determining unit SMLC and the delivery of the ten reports B1, B10 from the first base station BS1 to the position determining unit SMLC is obtained from the difference between the two points in time t2-t1. In this embodiment, this period of time t2-t1 is smaller than a maximum period of time t_max, which expires at a third point in time t3 and thus has a duration of t3-t1. As a result, the first base station BS1 can still prior to the expiry of the maximum period of time, deliver the ten reports B1, B10 to the position determining unit SMLC. The maximum period of time t_max determines the period of time within which the first base station BS1 has to deliver reports to the position determining unit so that the total time for estimating the position, i.e. the time which has expired from the moment of the request AUF for estimating the position up to provision of the information about an estimated position, does not exceed a maximum total time. For example, the position determining unit SMLC specifies the maximum period of time t_max for the first base station BS1.

In a third embodiment shown schematically in FIG. 3, at a first point in time t1, four reports B1, B2, B3, B4 are stored in the memory SP. At the third point in time t3, i.e. after expiry of the maximum period of time t_max, only a total of eight reports B1, B8 are stored in the memory SR In this case, the first base station BS1 no longer waits for additional reports from the subscriber station MS in order to prevent the total time for estimating a position from becoming too long. That is why in this embodiment, it delivers only the eight reports to the position determining unit SMLC instead of the ten reports. This results in the estimation of the position by the position determining unit SMLC possibly being more inexact than would be the case with the ten reports, but estimating the position in this way is always carried out within a maximum total time. The value of the maximum period of time t_max can be determined by the position determining unit SMLC or another network device, for example, depending on the nature of the position determining service, which transmits the request AUF for estimating the position of the subscriber station MS.

A request for estimating the position of a subscriber station MS can of course not only be generated by the external unit EXT, but also by the radio communication system, for example, by the subscriber station MS, by a switching center (MSC: Mobile Switching Center), by a Gateway Mobile Location Center (GMLC) or also by the position determining unit SMLC.

Further additional information, which can be used by the position determining unit SMLC in addition to the cell identification of the radio cell FZ of the first base station BS1 in order to improve the position estimation of the subscriber station MS, is the current transmitting power by which the subscriber station MS in each case sends its reports B1, B10 to the first base station BS1, together with the corresponding receive power of the reports B1, B10. This additional information is for example added to the reports B1, B10 of the subscriber station MS by the first base station BS1.

The memory SP of the first base station BS1 can for example be a memory, which stores a maximum set of ten reports and on the arrival of the eleventh report deletes the first report and in this way replaces the oldest report with the eleventh report. In this way, only the most up to date ten reports are always stored in the memory SP. This maximum set of stored reports corresponds, for example, to that number of reports, which are requested to the maximum by the position determining unit SMLC for estimating a position. The memory SP can of course be arranged both in the first base station BS1 and in another network device of the radio communication system, for example, in the base station controller BSC or in the position determining unit SMLC. As a matter of course, the memory SP can also be arranged in the subscriber station MS. Only after the reports have been requested, said reports are transmitted upon that time via the first base station BS1 to the position determining unit SMLC.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for estimating the position of a subscriber station in a radio communication system, comprising:
   receiving reports from the subscriber station at a receive station providing coverage for a radio cell in which the subscriber station is located, each report containing information relating to a signal strength at a location of the subscriber station of at least one receive signal received by the subscriber station and sent by a transmitting station;
   storing the reports in a memory of the receive station of the radio communication system providing coverage for the radio cell in which the subscriber station is located, such that received signal strength information is stored for signals received at the subscriber station from at least two different transmitting stations;
   receiving a request for position estimation at the receive station of the radio communication system; and
   estimating the position at a position determining unit taking into account at least two reports stored prior to the request for position estimation, wherein
   the position determining unit estimates position by comparing signal strengths obtained from the reports with signal strengths stored in a signal strength database;
   the position determining unit requests a second number of reports from the receive station;
   if the number of reports stored is fewer than the second number when the request for position estimation is received, then the receive station stores additional reports until the second number of reports has been stored or until a maximum period of time has expired,
   if the second number of reports is stored before expiration of the maximum period of time, then the receive station sends the second number of reports prior to the expiry of the maximum period of time, and
   if the second number of reports cannot be stored before expiration of the maximum period of time, then the base station sends all stored reports after the expiry of the maximum period of time, even if the number of stored reports remains smaller than the second number of reports.

2. The method according to claim 1, wherein the reports are received and/or stored regularly at specific time intervals.

3. The method according to claim 1, wherein the reports are received and stored regularly at specific time intervals, and the reports are received and stored during both an active connection and in an idle mode.

4. The method according to claim 1, wherein the memory stores a first number of reports as a maximum.

5. The method according to claim 1, wherein each report also contains information relating to a transmitting power used to transmit the at least one receive signal.

6. The method according to claim 1, wherein the reports also contain:
   a transmitting power used by the subscriber station to transmit the report to the receive station, and
   a receive power at which each report was received by the receive station in each case.

7. The method according to claim 1, wherein the reports are received and stored regularly at specific time intervals, and
   the reports are received and stored during both an active connection and in an idle mode.

8. The method according to claim 7, wherein the memory stores a first number of reports as a maximum.

9. The method according to claim 8, wherein the position determining unit requests a second number of reports from the network device.

10. The method according to claim 9, wherein
   if the number of reports stored is fewer than the second number when the request for position estimation is received, then the receive station stores additional reports until the second number of reports has been stored or until a maximum period of time has expired,
   if the second number of reports is stored before expiration of the maximum period of time, then the receive station sends the second number of reports prior to the expiry of the maximum period of time, and
   if the second number of reports cannot be stored before expiration of the maximum period of time, then the base station sends all stored reports after the expiry of the maximum period of time, even if the number of stored reports remains smaller than the second number of reports.

11. The method according to claim 10, wherein the position determining unit estimates position by comparing signal strengths obtained from the reports with signal strengths stored in a signal strength database.

12. The method according to claim 11, wherein each report also contains information relating to a transmitting Power used to transmit the at least one receive signal.

13. The method according to claim 12, wherein the reports also contain:
- a transmitting power used by the subscriber station to transmit the report to the receive station, and
- a receive power at which each report was received by the receive station in each case.

14. A receive station for a radio communication system, comprising:
- a memory for storing the reports, which the receive station providing coverage for a radio cell in which a subscriber station is located has received from the subscriber station, in which the reports in each case contain information relating to a signal strength at a location of the subscriber station of at least one receive signal received by the subscriber station and sent by a transmitting station, such that received signal strength information is stored for signals received at the subscriber station from at least two different transmitting stations;
- a transmitter to transmit, after a request for position estimation has been received at the receive station of the radio communication system, at least two reports stored prior to receiving the request for position estimation, the reports being transmitted to a position determining unit, in which the position is estimated taking into account the at least two reports; and
- a controller to control the receive station so that at least two reports are stored prior to the request for position estimation, wherein the position determining unit estimates position by comparing signal strengths obtained from the reports with signal strengths stored in a signal strength database;

the position determining unit requests a second number of reports from the receive station;

if the number of reports stored is fewer than the second number when the request for position estimation is received, then the receive station stores additional reports until the second number of reports has been stored or until a maximum period of time has expired, if the second number of reports is stored before expiration of the maximum period of time, then the receive station sends the second number of reports prior to the expiry of the maximum period of time, and if the second number of reports cannot be stored before expiration of the maximum period of time, then the base station sends all stored reports after the expiry of the maximum period of time, even if the number of stored reports remains smaller than the second number of reports.

* * * * *